March 17, 1931.　　　H. A. DAVIES　　　1,797,076
COMPOUND PIPE TOOL
Filed May 24, 1928
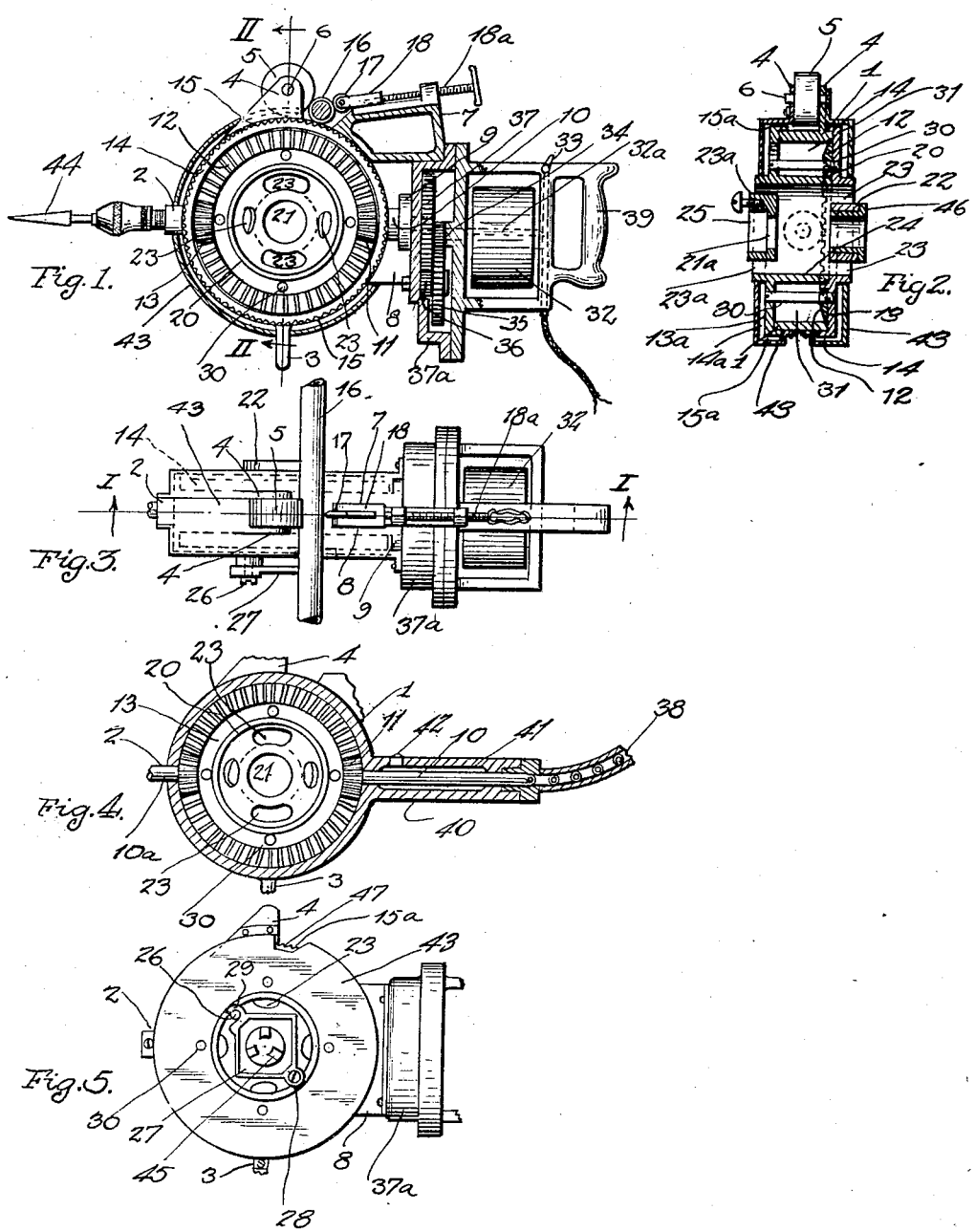
INVENTOR
Harold Allan Davies
BY
Francis H. Davis.
ATTORNEY Patented Mar. 17, 1931

1,797,076

UNITED STATES PATENT OFFICE

HAROLD ALLAN DAVIES, OF ALAMEDA, CALIFORNIA

COMPOUND PIPE TOOL

Application filed May 24, 1928. Serial No. 280,303.

This invention relates to improvements in compound pipe tools, and more particularly to a portable pipe-threading and pipe-cutting apparatus of novel design and great utility.

An object of my invention is to provide a tool of this character which may be operated by a self-contained electric motor, by flexible shafting or any other suitable agent.

Another object is to provide a tool that may be readily moved from place to place in a shop or elsewhere where it is more advantageous to bring a power-tool to the pipes that are to be operated on rather than bring the pipes to the tool.

A further object is to provide a tool of this class with means to rotate pipe against a pipe-cutting disc that is adapted to cut piping into lengths by being regulatively advanced toward said pipe while being revolved.

An additional object is to provide companion revoluble discs whose peripheries are provided with means for engaging the outer surface of a pipe to be cut so that rotation of said pipe is secured.

Another object of my invention is to provide an abutting roller means and means whereby said pipe may be revolved against said roller while under the advancing pressure of an adjustable pipe cutter.

Another object is to provide an internal bevel gear and diametrically opposite pinions therefor in suitable engagement.

A further object is to provide an outer flange member, provided internally with a concentric cylindrical member adapted to engage an annular ring on an opposite member flange member.

Another object is to provide through-bolt means to bolt both said flanges together so as to rotate in unison about a stationary frame member.

Another object is to provide speed reducing means adapted to cut-down speed from a motor.

A further object is to provide means for the interchangeable accommodation of the usual threading dies and suitable collets therefor.

Still another object is the provision of a peculiarly arranged oil chamber surrounding said pinions.

Another object is to provide an outer guard means.

A further object is to provide a detent means for said threading dies.

My invention has other novel and useful objects that will be more fully described in connection with the accompanying drawings, and which will be more fully pointed out in and by the appended claim.

In the drawings:—

Figure 1 is a partially sectional view taken on the line I—I of Fig. 3.

Fig. 2 is a transverse section on the line II—II of Fig. 1.

Fig. 3 is a top view of my invention.

Fig. 4 is a mid-sectional elevation of my invention showing different drive means.

Fig. 5 is a side elevational view of the invention.

Like reference characters designate similar parts throughout the different figures of the drawing.

In the drawings, 1 designates the structural frame of the tool, which may be described as an annular metallic ring preferably of quadrilaterial cross-section whose outer edges are turned true in parallel planes, the inner circumference being bored cylindrical, the outer edges thereof being turned concentric therewith for a certain distance in from said edges for a purpose to be explained. At the various points denoted in Fig. 1 the frame is provided with the bearing-boss 2, the stub-handle 3 the abutment-roller brackets 4—4 which mount the abutment roller 5 on the axis 6, the pipe-cutter bracket 7 and the main bracket 8, said bracket being provided with the flange 9 and bored to journal the shaft 10, said shaft being provided with the bevel pinion 11 fast thereto and intermeshed with the bevel gear 12, said gear being formed integral with or otherwise suitably attached to the revoluble member 13, said member being provided with the cylindrical inturned flange 14 which is formed so as to cup over the right-hand edge of the frame 1 so as to be a close working fit in revoluble relation to said structural frame. Said flange 14 is provided all round the outer circumference thereof with the teeth 15 that are adapted to engage the adjacent surface of a pipe as 16 when disposed transversely thereover between said abutment roller 5 and the pipe-cutter member 17 which is mounted on the fork 18 loosely connected to the screw 18a that is adapted for regulative forward or backward movement longitudinally of the bracket 7.

The central inner portion of the member 13 is provided with the flange 20 uprising therefrom and concentric therewith, with the central hole 21 that is provided on the reverse side of said member with the projecting flange or rim 22, and further provided with the perforations 23, for a purpose to be explained.

Now, by reference to Fig. 2 it will be seen that the member 13 has an opposing member 13a provided with the inwardly-projecting cylindrical hub like portion 24, the die holder 25, the central perforation 21a the perforations 23a, and detent means. The detent means comprise the cover 27 loosely pivoted about the pivot screw 28 and provided with the notch 29 for engagement with the setscrew 26. The member 13 is further provided with the flange 14a having toothed notches 15a and being bored out to a nice adjustment of parts so that when the two said members are clamped together one on each side of the frame 1 by the bolts 30, said members may be rotated in unison about said supporting frame 1 with the enclosed space 31 (Fig. 2) well adapted to act as an oil reservoir for said pinions and said gear to run in; whereas the perforations 23 serve as escapes for oil that is fed to the die during operation of the tool, and also for the escape of cuttings.

The drive mechanism

Having described the tool proper, attention is now directed to the drive mechanism which may be of any suitable character so long as it will function to actuate said tool. Preferably I use a reversible electric motor as indicated by 32, said motor having a drive shaft 32a acting in either direction as desired by throwing a switch diagrammatically indicated by 33 which need not be either fully illustrated nor described as it is too well known and as it forms no part of the present invention beyond the fact that it is an electric motor suitably wired for portable use and has a starting and stopping and reversing means represented by said switch 33. The shaft 32a carries the pinion 34 keyed thereon and engaging the speed reducing train of gears comprised in the members 35, 36 and 37, which latter is keyed to the shaft 10 that drives the pinion 11, said gears being suitably journaled in the walls of the housing 37a.

Another form of drive is shown in Fig. 4, wherein a flexible drive-shaft 38, which may be run at a slower speed, is shown coupled directly to said shaft 10, it being understood that the shaft 38 is adapted to be driven by any suitable means. In the motor form of drive I prefer to use the handles 39 and 3 as shown in Fig. 1, whereas in the form of my invention shown in Fig. 4 I prefer to use the stub handle 3 and the bearing-like handle 40 provided with the oil recess 41 and the oiling means 42. As a safety means for the protection of operators of my tools I encase the moving parts in the outer shell 43—43.

In the operation of cutting pipe into suitable lengths all that is necessary to do is to have the required pipe within reach of actuative power and then place the individual pipe to be cut in the position shown at 16 in Figs. 1 and 3 and bring the cutting member in contact with said pipe by advancing the screw 18a. Then by starting said motor or said flexible shaft, as the case may be, the members 14 and 14a will be caused to rotate, and the toothed notches 15 and 15a will by contacting therewith cause said pipe to rotate, said pipe being revolubly held in its relative position between the abutment roller 5 and said cutting member 17 in the gap 47 of the shell 43.

After a suitable number of pipes have been cut they may be reamed by inserting the reamer 44 in the ends of said pipes and causing the tool to ream them.

When threading pipe all that is necessary is to select the corresponding die 45 and collet 46 and insert the same by the obvious means. Then if the pipe is held in suitable means as an ordinary pipe vise, my power tool may be easily slipped over the pipe ends and caused to thread said pipe by operating said power agent in one direction and be backed off said thread by reversing the direction of said agent.

It is believed that the construction, operation and advantages of the invention will now be clearly understood. The present embodiments of the invention have been disclosed in detail merely by way of example, since in actual practice they attain the features of advantage set forth as being desirable in the statement of the invention and the above description.

Numerous changes in the details of construction, and in the combination and arrangement of parts may be resorted to without departing from the spirit or scope of the invention as hereinafter claimed or sacrificing any of its advantages.

Having thus described my invention, what I claim as new is:—

A tool of the character described comprising means for power application, a relatively stationary annular metallic frame, opposing members revolubly carried by the frame, drive means for the members, one of said members provided peripherally with toothed means adapted to revolve a pipe by surface engagement therewith, revoluble abutment means, a cutter means and regulative adjustment means therefor, all the said means carried by said frame.

In testimony whereof I have set my hand to this specification this 11 day of May, 1928.

HAROLD ALLAN DAVIES.